United States Patent [19]

Campbell et al.

[11] Patent Number: 4,943,928

[45] Date of Patent: Jul. 24, 1990

[54] ELONGATED CARRIER WITH A PLURALITY OF SPOT-SOURCES OF HEAT FOR USE WITH STEREOLITHOGRAPHIC SYSTEM

[76] Inventors: Albert E. Campbell, 275 W. Lemon, Arcadia, Calif. 91104; William F. Hug, 2239 E. Paloma St., Pasadena, Calif. 91006; Ray D. Reid, 921 Englewild, Glendora, Calif. 91740

[21] Appl. No.: 246,503

[22] Filed: Sep. 19, 1988

[51] Int. Cl.$^5$ .................... G06F 15/46; B29C 35/08
[52] U.S. Cl. .................... 364/477; 156/275.5; 156/379.6; 264/22; 425/162; 425/174
[58] Field of Search ............... 364/477, 468, 469, 473, 364/476; 425/162, 174, 174.4, 174.6; 264/22, 24, 25, 27; 365/120, 119, 127; 156/58, 59, 272.2, 345, 367, 378, 379.6, 379.8, 379.9, 643; 414/222

[56] References Cited

U.S. PATENT DOCUMENTS

| | | | |
|---|---|---|---|
| 4,252,514 | 2/1981 | Gates | 425/162 |
| 4,412,799 | 11/1983 | Gates | 425/162 X |
| 4,471,470 | 9/1984 | Swainson et al. | 365/127 |
| 4,575,330 | 3/1986 | Hull | 425/162 X |
| 4,752,352 | 6/1988 | Feygin | 264/109 X |
| 4,752,498 | 6/1988 | Fudim | 264/22 X |
| 4,801,477 | 1/1989 | Fudim | 264/22 X |

Primary Examiner—Joseph Ruggiero
Attorney, Agent, or Firm—W. Edward Johansen

[57] ABSTRACT

An improved stereolithographic system which produces a three-dimensional object from a heat curable fluid medium which is capable of solidification when subjected to heat includes a computer-aided design controller, a container, an elevator platform and a first servo mechanism which incrementally drives the elevator platform in response to the output signals. The improved stereolithographic system also includes an elongated carrier which is movably coupled to the container, a second servo mechanism which incrementally drives the elongated carrier along the two side walls of the container in response to the output signals, a plurality of spot-sources of heat and a switching network. Each spot-source of heat may be individually switched on and is serially disposed on and fixedly coupled to the bottom surface of the elongated carrier on the bottom surface adjacent to the designated working surface. The switching network individually switches on each spot-source of heat in response to each set of output signals. The bottom surface of the elongated carrier travels across the plane of the designated working surface in order to produce a cross-sectional lamina. When the cross-sectional lamina has been produced the elevator platform moves incrementally down the thickness of one of the cross-sectional laminae in order to produce the next cross-sectional laminae.

4 Claims, 2 Drawing Sheets

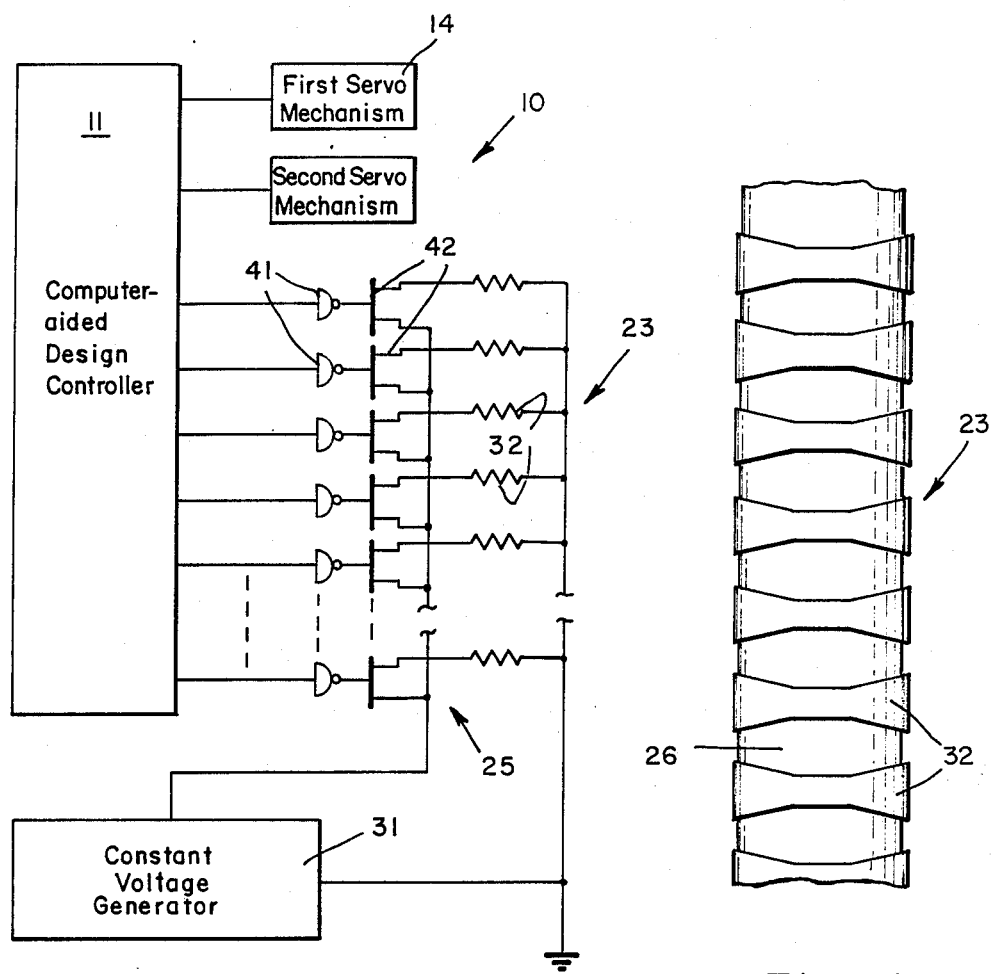
Fig. 1.
Fig. 4.
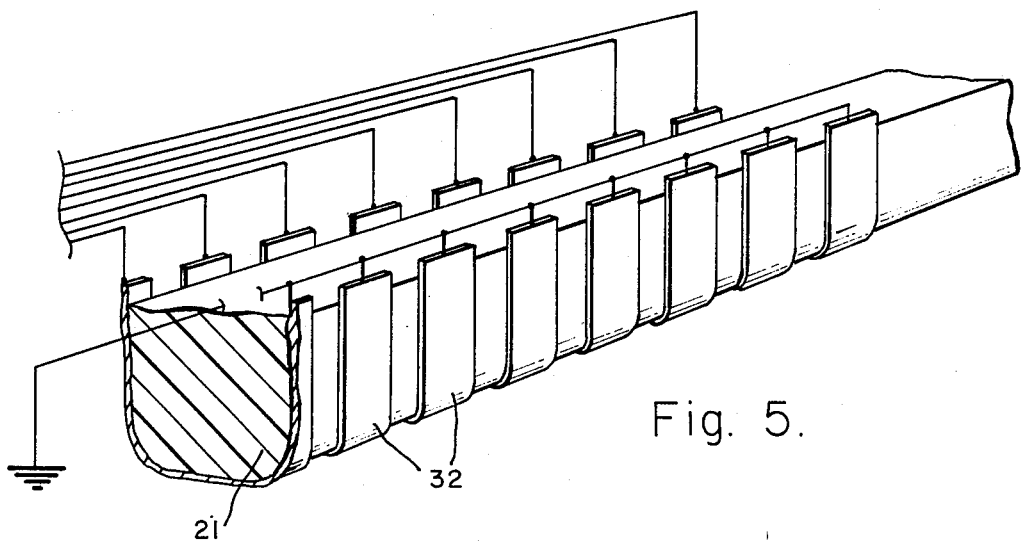
Fig. 5.

ELONGATED CARRIER WITH A PLURALITY OF SPOT-SOURCES OF HEAT FOR USE WITH STEREOLITHOGRAPHIC SYSTEM

BACKGROUND OF THE INVENTION

1. Field of the Inventions

This invention relates to a stereolithographic system for producing a three-dimensional object from a heat curable fluid medium which is capable of solidification when subjected to heat and more particularly to an improvement therefor which eliminates the use of costly components and increases the speed of the process.

2. Description of the Prior Art

U.S. Pat. No. 4,575,330, entitled Apparatus for Production of Three-Dimensional Objects by Stereolithography, issued to Charles W. Hull on Mar. 11, 1986, teaches a stereolithographic system for producing a three-dimensional object from a UV curable liquid which is capable of solidification when subjected to ultraviolet light energy. U.S. Pat. No. 4,100,141 teaches a typical UV curable liquid which is capable of solidification when subjected to ultraviolet light. The stereolithographic system includes a computer-aided design controller which generates a plurality of sets of output signals each set of which corresponds to one of a plurality of successive cross-sectional laminae of a three-dimensional object. The stereolithographic system also includes a container and an elevator platform. The container is filled with the UV curable liquid which provides a designated working surface. The elevator platform is disposed in the container just below the designated working surface of the UV curable liquid. The stereolithographic system further includes a ultraviolet light source and a moving mechanism for moving the elevator platform down. The programmable ultraviolet light source produces a spot of ultraviolet light which is movable in the plane of the designated working surface in response to one of the sets of output signals. The computer-aided design controller moves the spot of ultraviolet light incrementally from an initial position to a contiguous position in the plane of the designated working surface. The computer-aided design controller also moves the elevator platform down incrementally as each successive cross-sectional lamina of the three-dimensional object is drawn upon and formed from the UV curable liquid.

U.S. Pat. No. 4,041,476, entitled Method, Medium and Apparatus for Producing Three-Dimensional Figure Product, issued to Wyn Kelly Swainson on Aug. 9, 1977, teaches an apparatus in which a three-dimensional figure product is formed in situ in a medium having two active components by causing two radiation beams to intersect in the media. The dissimilar components are selected to respond to the simultaneous presence of the beam and either to react or to produce reactants which render the intersection of the beams physically sensible or distinguishable. The beams trace surface elements of the figure product to be produced.

U.S. Pat. No. 4,288,861, entitled Three-Dimensional Systems, issued to Stephen D. Kramer and Wyn K. Swainson on Sept. 8, 1981, teaches a multiple beam absorption effect which is used for creating three-dimensional sensible objects including optical elements and three-dimensional computer-type data storage and retrieval systems. The objects are made by at least two beams of optical electromagnetic radiation having a spectral characteristic which is matched to the excited state properties of active media molecules. The beams are either simultaneously or sequentially directed to a common target location to effect a desired photochemical reaction. The first beam effects excitation of the molecule of the active media at the target locations such that the coincidence of the second beam and absorption thereof by the individual molecules at the target location effects a controlled chemical reaction causing a change in physical or refractive index characteristics. The change produces physical or refractive index inhomogeneities.

U.S. Pat. No. 4,238,840, entitled Method, Medium and Apparatus for Producing Three Dimensional Figure Product, issued to Wyn K. Swainson on Dec. 9, 1980, teaches a method for forming a three-dimensional figure in situ in a medium having two active components by causing two radiation beams to intersect in the media. The dissimilar components are selected to respond to the simultaneous presence of the beams and to either react or to produce reactants which render the intersection of the beams physically sensible or distinguishable. The beams trace surface elements of the figure to be produced.

U.S. Pat. No. 4,078,229, entitled Three Dimensional Systems, issued to Stephen D. Kramer and Wyn K. Swainson on Mar. 7, 1978, teaches a method for producing three-dimensional sensible objects by the intersection of radiation beams. An active region is produced as a result of the intersection of the beams raising a molecule in the active region to its excited state. Non-radiation emissive active regions are formed which generate the sensible object.

U.S. Pat. No. 4,466,080, entitled Three-Dimensional Patterned Media, issued to Stephen D. Kramer and Wyn K. Swainson on Aug. 14, 1984, teaches an active media for controlled production of physical and refractive index inhomogenetics in a volume of a suspension medium by use of at least two intersecting beams of electromagnetic radiation matched to the excited state properties of molecules in the media. Complex three-dimensional physical and chemical structures are produced by selective excitation of different types of molecules in the media and by employing transportive capabilities of liquid or gaseous support medium.

U.S. Pat. No. 4,404,573, entitled Electrostatic Ink Jet System, issued to Ray H. Kocot, Robert E. Rudd, III and Douglas R. Arnoldi on Sept. 13, 1983, teaches a low-head pressure, high flow single, filament ink jet system which is capable of delivering fluid to a particular point in a controlled manner.

U.S. Pat. No. 4,404,574 entitled Electrographic Printing System Using Dielectric Film Member, issued to Herman Burwasser and John R. Wyhof on Sept. 13, 1983, Herman Burwasser and John R. Wyhof on Sept. 13, 1983, teaches an electrographic printing system in which a latent image is electrographically transferred to a dielectric record member from an image-bearing electrode in close proximity to the dieletric record member. The image may be subsequently rendered visible by application of a toner and permanently fixed into the dieletric record member.

SUMMARY OF THE INVENTION

In view of the foregoing factors and conditions characteristic of the prior art it is the primary object of this invention to provide an improvement for use with a stereolithographic system for producing a three-dimensional object from a heat curable fluid medium which is capable of solidification when subjected to heat which eliminates the use of costly components such as an UV laser system.

It is another object of the present invention to provide an improvement for use with a stereolithographic system which greatly increases the speed of the process.

In accordance with an embodiment of the present invention an improved stereolithographic system which produces a three-dimensional object from a heat curable fluid medium which is capable of solidification when subjected to heat is described. The improved stereolithographic system includes a computer-aided design controller, a container, an elevator platform and a first servo mechanism which incrementally drives the elevator platform in response to the output signals. The improved stereolithographic system also includes an elongated carrier which is movably coupled to the container, a second servo mechanism which incrementally drives the elongated carrier along the two side walls of the container in response to the output signals, a plurality of spot-sources of heat and a switching network. Each spot-source of heat may be individually switched on and is serially disposed on and fixedly coupled to the bottom surface of the elongated carrier on the bottom surface adjacent to the designated working surface. The switching network individually switches on each spot-source of heat in response to each set of output signals. The bottom surface of the elongated carrier travels across the plane of the designated working surface in order to produce a cross-sectional lamina. When the cross-sectional lamina has been produced the elevator platform moves incrementally down the thickness of one of the cross-sectional laminae in order to produce the next cross-sectional laminae.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a schematic drawing of the electrical components of a stereolithographic system for producing a three-dimensional object from a heat curable fluid medium which is capable of solidification when subjected to heat.

FIG. 4 is a partial bottom plan view of the elongated carrier of FIG. 3 showing some of the plurality of spot sources of heat each of which is a resistive heating element which is disposed thereon.

FIG. 5 is a perspective drawing in cross-section of the elongated carrier of FIG. 4.

DESCRIPTION OF THE PREFERRED EMBODIMENT

Figure 2:
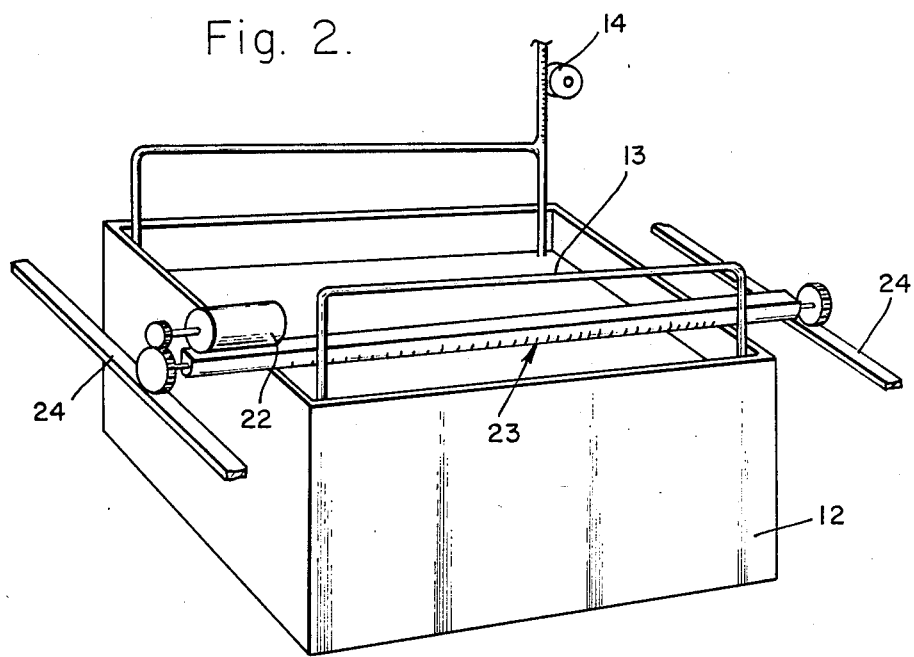
FIG. 2 is a perspective drawing of a container of the stereolithographic system of FIG. 1.

In order to best understand the present invention it is necessary to refer to the following description of its preferred embodiment conjunction with the accompanying drawing. Referring to FIG. 1 in conjunction with FIG. 2 a stereolithographic system 10 includes a computer-aided design controller 11, a container 12, an elevator platform 13 and a first servo mechanism 14. The computer-aided design controller 11 generates a plurality of sets of output signals each set of which corresponds to one of a plurality of successive cross-sectional laminae of a three-dimensional object. The container 12 has a front wall, a rear wall and two side walls and is filled with a heat curable fluid medium the surface of which provides a designated working surface. The elevator platform 13 is movably coupled to the container 12 and which is disposed in the heat curable fluid medium. The first servo mechanism 14 incrementally drives the elevator platform 13 in response to the output signals. U.S. Pat. No. 4,575,330 teaches a similar stereolithographic system for producing a three-dimensional object from a UV curable liquid which is capable of solidification when subjected to ultraviolet light. U.S. Pat. No. 4,100,141 teaches a typical UV curable liquid which is capable of solidification when subjected to ultraviolet light energy. The stereolithographic system 10 produces a three-dimensional object from the heat curable fluid medium which is a heat curable liquid capable of solidification when subjected to heat.

Figure 3:
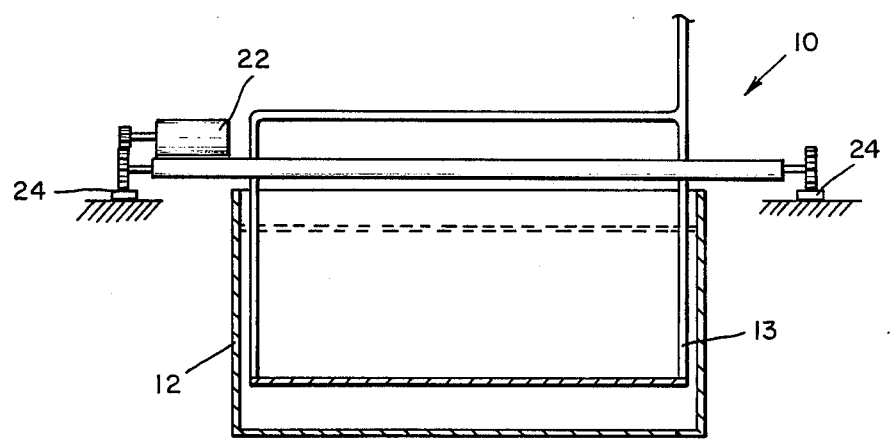
FIG. 3 is a side elevational view of the container in cross-section of FIG. 2 and an elongated carrier which has a plurality of spot sources of heat and which has been constructed in accordance with the principles of the present invention.

Referring to FIG. 2 in conjunction with FIG. 3 the stereolithographic system 10 also includes an elongated carrier 21, a second servo mechanism 22, a plurality of spot-sources 23 of heat, a pair of parallelly disposed tracks 24 and a switching network 25. The elongated carrier 21 has a bottom surface 26 which is movably coupled to the container 12 so that it may travel perpendicularly to and bidirectionally along the two side walls of the container 12 above the designated working surface. The second servo mechanism 22 drives the elongated carrier 21 along the parallelly disposed tracks 24 in response to the output signals bidirectionally along and perpendicularly to the two side walls of the container 12 in response to the output signals. Each spot-source 23 of heat may be individually switched on and is serially disposed on and fixedly coupled to the bottom surface 26 of the elongated carrier 21 adjacent to the designated working surface. The switching network 25 individually switches on each spot-source 23 in response to each set of output signals. The bottom surface 26 of the elongated carrier 21 travels across the plane of the designated working surface in order to produce a cross-sectional lamina. When the cross-sectional lamina has been produced the elevator platform 13 moves incrementally down the thickness of one of the cross-sectional laminae in order to produce the next cross-sectional laminae.

Referring to FIG. 4 in conjunction with FIG. 1 and FIG. 5 the plurality of spot-sources 23 of heat includes a constant voltage generator 31 and plurality of resistive heating elements 32. The constant voltage generator 31 is electrically coupled to ground and to the switching network 25. Each resistive heating element 32 is disposed on the bottom surface 26 of the elongated carrier 21. Each resistive heating element 32 has a first lead and a second lead and may be a resistive material deposited on a thin layer of a polymeric layer. The first lead of each resistive heating element 32 is electrically coupled to ground. The second lead of each resistive heating element 32 is electrically coupled to the switching network 25 which includes a plurality of gates 41 and a plurality of MOSFET switches 42. Each gate 41 has an input and an output. The input of each gate 41 is electrically coupled to the computer-aided design controller 11. Each MOSFET switch 42 has a base, an input, an output. The base of each MOSFET switch 42 is electrically coupled to the output of one of the gates 41. The input of each MOSFET switch 42 is electrically coupled to the output of the constant voltage generator 31. The output of each MOSFET switch 42 is electrically coupled to the output of the second lead of one of the resistive heating elements 32. The heat radiates onto the heat curable fluid medium.

From the foregoing it can be seen that an improvement for use in a stereolithographic system has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. An improvement for use in a stereolithographic system for producing a three-dimensional object from a heat curable fluid medium which is capable of solidification when subjected to heat, the stereolithographic system including:
    a. a computer-aided design controller which generates a plurality of sets of output signals each set of which corresponds to one of a plurality of successive cross-sectional laminae of a three-dimensional object;
    b. a container which has a front wall, a rear wall and two side walls and which is filled with the heat curable fluid medium the surface of which provides a designated working surface;
    c. an elevator platform which is movably coupled to the container and which is disposed in the heat curable fluid medium; and
    d. a servo mechanism which incrementally drives the elevator platform in response to the output signals, said improvement comprising:
        a. an elongated carrier which has a bottom surface and which is disposed perpendicular to the two side walls and parallel to the front and rear walls of the container;
        b. driving means for incrementally driving said elongated carrier along the two side walls of the container in response to the output signals;
        c. a plurality of spot-sources of heat, each of said spot-sources of heat being individually switched on and serially disposed on and fixedly coupled to said bottom surface of said elongated carrier adjacent to the designated working surface; and
        d. switching means for individually switching on each of said spot-sources of heat in response to each set of output signals whereby said bottom surface of said elongated carrier travels across the plane of the designated working surface in order to produce a cross-sectional lamina and when the cross-sectional lamina has been produced the elevator platform moves incrementally down the thickness of one of the cross-sectional laminae in order to produce the next cross-sectional laminae.

2. An improvement for use in a stereolithographic system according to claim 1 wherein said driving means comprises
    a. a pair of parallelly disposed tracks which are disposed parallel and fixedly coupled to the two side walls of the container above the designated working surface; and
    b. a second servo mechanism which drives said elongated carrier along said pair of parallelly disposed tracks in response to the output signals.

3. An improvement for use in a stereolithographic system according to claim 1 wherein said spot-sources of heat comprise:
    a. a constant voltage generator which is electrically coupled to ground and to said switching means; and
    b. resistive heating elements which are disposed on said bottom surface of said elongated carrier and which have a first lead which is electrically coupled to ground and a second lead which is electrically coupled to said switching means.

4. An improvement for use in a stereolithographic system according to claim 3 wherein said switching means is a switching network comprising:
    a. a plurality of gates each of which has an input and an output, with said input of each of said gates being electrically coupled to the computer-aided design controller; and
    b. a plurality of MOSFET switches having a base, an input, an output, said base of each of said MOSFET switches being electrically coupled to said output of one of said gates, said input of each of said MOSFET switches being electrically coupled to said output of said constant voltage generator and said output of each of said MOSFET switches being electrically coupled to said output of said second lead of one of said resistive heating elements.

* * * * *